Patented Dec. 1, 1931

1,834,161

UNITED STATES PATENT OFFICE

HAROLD P. KNIGHT, OF TRONA, CALIFORNIA, ASSIGNOR TO PACIFIC COAST BORAX COMPANY, A CORPORATION OF NEVADA

PROCESS FOR THE RECOVERY OF COMMERCIALLY PURE POTASSIUM CHLORIDE FROM ALKALINE BRINE

No Drawing. Application filed September 25, 1928. Serial No. 308,340.

This invention relates particularly to the recovery of potassium chloride and may be more specifically described as comprising a process for recovering commercially pure potassium chloride from an alkaline brine. The term "alkaline brine" which will be used throughout the specification and claims, refers to a solution containing potassium chloride (KCl) with a mixture of other salts such as, for example, the brine from Searles Lake or Owens Lake, California, of which the major constituents may be considered as potassium chloride (KCl), sodium carbonate ($Na_2CO_3$), sodium sulphate ($Na_2SO_4$), sodium mono-borate ($Na_2B_2O_4$), sodium bi-borate ($Na_2B_4O_7$) and sodium chloride (NaCl).

The ordinary practice in treating an alkaline brine, of the class described above, for the recovery of potassium chloride, is to evaporate the solution for the purpose of increasing the concentration and to cool or refrigerate the concentrated solution to a temperature at which the potassium chloride will crystallize and be precipitated.

The procedure outlined above has met with considerable difficulty and has been deemed unsatisfactory, the chief undesirable features being excessive foaming of the liquors during evaporation, scaling of the heating surfaces due chiefly to the deposition of a double salt of sodium carbonate and sodium sulphate, and contamination of the recovered potassium chloride by sodium bi-borate and loss of potash content due to the formation of the double salt of sodium and potassium sulphate, known as glaserite.

It is therefore desirable in treating a solution of the class described above, for the purpose of recovering potassium chloride, to first subject the solution to a preliminary treatment which will not adversely affect the potassium chloride concentration in the solution but which will remove sufficient of the other salts (sodium carbonate, sodium borates and sodium sulphate) to prevent their deposition during the subsequent evaporation of the solution and crystallization of the potassium chloride.

It is obvious that this preliminary treatment must be carried out in the absence of high temperatures or decreased pressures, and it has been found by experiment that, to preclude the deposition of the double salt of sodium sulphate and sodium carbonate during subsequent evaporation, the sodium salts should be removed to a point at which the sodium content of the solution (calculated as $Na_2O$) is not greater than fifteen grams per liter.

It is therefore an object of this invention to produce a process for recovering potassium chloride from an alkaline brine in which the sodium carbonate, the sodium borates and the sodium sulphate are in part removed from the solution without the use of elevated temperatures or decreased pressures, such removal being carried to a point at which these salts will not be deposited during the subsequent crystallization of the potassium chloride.

It is a further object of the invention to produce a process which affords the additional advantage of making possible the recovery of sodium chloride of commercial purity.

The preferred manner of carrying out this process is to subject the solution to a preliminary carbonation effected by passing carbon dioxide ($CO_2$) gas through the solution and then cooling or refrigerating the resultant solution to a relatively low temperature.

The carbon dioxide reacts with the soluble sodium mono-borate to convert it to the less soluble bi-borate, and with the sodium carbonate to convert it to sodium bi-carbonate, according to the following reactions:

(1) $2Na_2B_2O_4 + CO_2 = Na_2B_4O_7 + Na_2CO_3$
(2) $2Na_2CO_3 + 2CO_2 + 2H_2O = 4NaHCO_3$

The sodium bi-carbonate is precipitated during the carbonation of the solution and may be removed by ordinary filtration steps to be marketed as such or converted to other products such as soda ash.

The carbonated brine is then chilled to reduce the sodium sulphate and sodium bi-borate contents to a concentration at which they cannot again reach a point of separation during subsequent evaporation and cooling of the brine in removing the potassium chloride.

A satisfactory temperature which has been used in this first cooling step is substantially within a range of 0° C. to −10° C. and the term "refrigeration" as hereinafter used will refer to the step of cooling to a temperature substantially within the range of 0° to −10° C. It will be understood of course that low temperatures above or below this range might be employed, but it has been found that when temperatures above 0° centigrade are used, the subsequent evaporation step cannot be carried to the point at which the greatest yield of high purity potassium chloride per cycle may be obtained; or if the evaporation be carried to a point at which the solution is saturated with potassium chloride, to obtain a greater yield, losses of potassium in the form of glaserite will be incurred.

The sodium sulphate and sodium bi-borate which are precipitated during this initial chilling or refrigerating step are removed from the solution in any preferred manner as by filtration or decantation, and the resultant liquor is evaporated to increase its concentration.

In the event sodium chloride is present in the solution, this salt will be precipitated continuously during this concentrating step, and it will be apparent that the preliminary steps described above will prevent the contamination of the otherwise commercially pure grade of sodium chloride.

The concentration of the carbonated and refrigerated solution is carried to a point at which the solution is saturated with respect to potassium chloride. The deposited sodium chloride may be removed during or after the evaporation, after which the solution is again cooled. This last step results in the precipitation or crystallization of commercially pure potassium chloride which may be removed from the solution and purified or may be marketed as the commercially pure salt. The resultant mother liquor may be cyclically re-used in any manner well known to those familiar with the art.

This process may be described more succinctly as comprising the four steps of (1) Carbonation, (2) Refrigeration, (3) Evaporation and (4) Crystallization. The first step results in the deposition of sodium bi-carbonate; the second, of sodium sulphate and sodium bi-borate; the third, of commercially pure sodium chloride; and the fourth, of commercially pure potassium chloride.

The mother liquor from the fourth step may be returned to the process by introduction with the brine of the first step at the beginning of each successive cycle or at an intermediate point.

As an example of the value of the four steps outlined above, for the recovery of potassium chloride, it might be stated that the use of a chilling operation without carbonation, prior to the concentration step, is effective to remove not more than fifty (50%) per cent of the total sodium borates from a solution such as Searles Lake brine. By introducing carbonation ahead of the refrigeration, the highly soluble mono-borate is converted to the less soluble bi-borate and, due to this factor, at least fifty (50%) per cent more of the borate ion is removable by the subsequent chilling step than has heretofore been the case.

The process is not difficult to control. It has been found that, if the carbonation step is carried to a point at which the sodium content of the solution (calculated as $Na_2O$) is preferably not greater than fifteen grams per liter, and the resultant solution cooled to a temperature between 0° C. and −10° C., a commercially pure grade of potassium chloride may be recovered in the final operation.

It will be understood that while the process has been described in connection with a definite mixed solution of salts, and although preferred temperature and control conditions have been mentioned in connection with the various steps, the process is not restricted to the precise conditions set forth above but includes within its scope such changes or variations as may fairly come within the scope of the appended claims.

I claim as my invention:

1. A process for recovering commercially pure potassium chloride from an alkaline brine solution of potassium chloride which includes the steps of carbonation followed first by refrigeration, then by evaporation and a subsequent crystallization of the potassium chloride.

2. A process for recovering commercially pure potassium chloride from an alkaline brine solution of potassium chloride which includes the steps of carbonation followed first by refrigeration, then by evaporation and a subsequent crystallization of the potassium chloride, said initial carbonating and refrigerating steps being effective to remove scale forming and foam producing salts from said solution, and to preclude borax contamination of the recovered potassium chloride.

3. A process for recovering commercially pure potassium chloride from an alkaline solution of potassium chloride containing sodium mono-borate which comprises converting the sodium mono-borate to sodium bi-borate, then refrigerating the solution to effect a precipitation of the sodium bi-borate and subsequently removing the potassium chloride from the resultant solution.

4. A process for recovering commercially pure potassium chloride from an alkaline solution of potassium chloride cotaining sodium mono-borate which comprises converting the sodium mono-borate to sodium bi-borate, then refrigerating the solution to effect a precipitation of the sodium bi-borate and subsequentaly removing the potassium chloride from the resultant solution by subsequent concentration and cooling of the solution.

5. A process for recovering commercially pure potassium chloride from an alkaline solution of potassium chloride containing sodium mono-borate which comprises converting the sodium mono-borate to sodium bi-borate by a process of carbonation, then refrigerating the solution to effect a precipitation of the sodium bi-borate and subsequently removing the potassium chloride from the resultant solution.

6. A process for recovering commercially pure potassium chloride from a solution of potassium chloride containing sodium carbonate, sodium sulphate and sodium mono-borate which comprises carbonating the solution to effect a conversion of sodium carbonate and sodium mono-borate to sodium bi-carbonate and sodium bi-borate, respectively; then refrigerating the solution to effect a precipitation of sodium bi-borate and sodium sulphate; removing the precipitated compounds from the solution; subsequently evaporating the resultant solution and cooling the evaporated solution to effect a precipitation of the potassium chloride.

7. A process for treating a solution containing sodium carbonate, sodium borates and potassium chloride which includes the steps of first carbonating and second refrigerating the solution for effecting the removal of the sodium carbonate and the sodium borates, the carbonation being carried to a point at which the sodium content of the solution is not greater than fifteen grams per liter (calculated as $Na_2O$), and removing potassium chloride from the resultant solution.

8. A process for recovering commercially pure potassium chloride from an alkaline brine solution of potassium chloride, which includes the steps of carbonating the solution, cooling to a temperature between 0° C. and −10° C., and subsequently concentrating and cooling the solution to effect a crystallization of potassium chloride.

9. A process for treating a solution containing sodium borates and potassium chloride which includes the carbonation and refrigeration of the solution to a temperature between 0° and −10° C., for effecting a removal of borates sufficient to prevent a precipitation of said borates during a subsequent precipitation of potassium chloride from the solution.

In testimony whereof, I have hereunto set my hand at Los Angeles, California, this 17th day of September, 1928.

HAROLD P. KNIGHT.